United States Patent
Henry et al.

(10) Patent No.: US 6,233,676 B1
(45) Date of Patent: May 15, 2001

(54) APPARATUS AND METHOD FOR FAST FORWARD BRANCH

(75) Inventors: G. Glenn Henry; Terry Parks, both of Austin, TX (US)

(73) Assignee: IP-First, L.L.C., Fremont, CA (US)

( * ) Notice: Subject to any disclaimer, the term of this patent is extended or adjusted under 35 U.S.C. 154(b) by 0 days.

(21) Appl. No.: 09/272,226

(22) Filed: Mar. 18, 1999

(51) Int. Cl.[7] .................................................. G06F 9/38
(52) U.S. Cl. ...................... 712/233; 712/234; 712/238; 712/239
(58) Field of Search ................................... 712/205, 233, 712/234, 235, 236, 237, 238, 239, 204, 207; 710/52, 54, 56

(56) References Cited

U.S. PATENT DOCUMENTS

| | | | |
|---|---|---|---|
| 4,974,155 | * 11/1990 | Dulong et al. | 712/219 |
| 5,142,634 | * 8/1992 | Fite et al. | 712/240 |
| 5,485,587 | * 1/1996 | Matsuo et al. | 712/234 |
| 5,574,871 | * 11/1996 | Hoyt et al. | 712/200 |
| 5,850,543 | * 12/1998 | Shiell et al. | 712/238 |
| 5,850,551 | * 12/1998 | Takayama et al. | 395/708 |
| 5,889,986 | * 3/1999 | Nguyen et al. | 712/237 |
| 5,961,637 | * 10/1999 | Sturges et al. | 712/235 |

* cited by examiner

Primary Examiner—Eddie Chan
Assistant Examiner—Dzung C. Nguyen
(74) Attorney, Agent, or Firm—Richard K. Huffman; James W. Huffman

(57) ABSTRACT

An apparatus and method are provided for executing a forward branch in a microprocessor. The apparatus has translation logic and instruction fetch logic. The translation logic utilizes a branch predictor to determine if a conditional branch should be taken or not. If the branch is predicted taken, then a branch accelerator in the instruction fetch logic determines if a branch target instruction has already been stored for translation in an instruction buffer by summing the length of the conditional branch instruction to a displacement provided by the conditional branch instruction. If the branch target instruction is already within the instruction buffer, contents of the instruction buffer are simply shifted by the number of bytes indicated by the sum to move the branch target instruction to the front of the buffer.

27 Claims, 5 Drawing Sheets

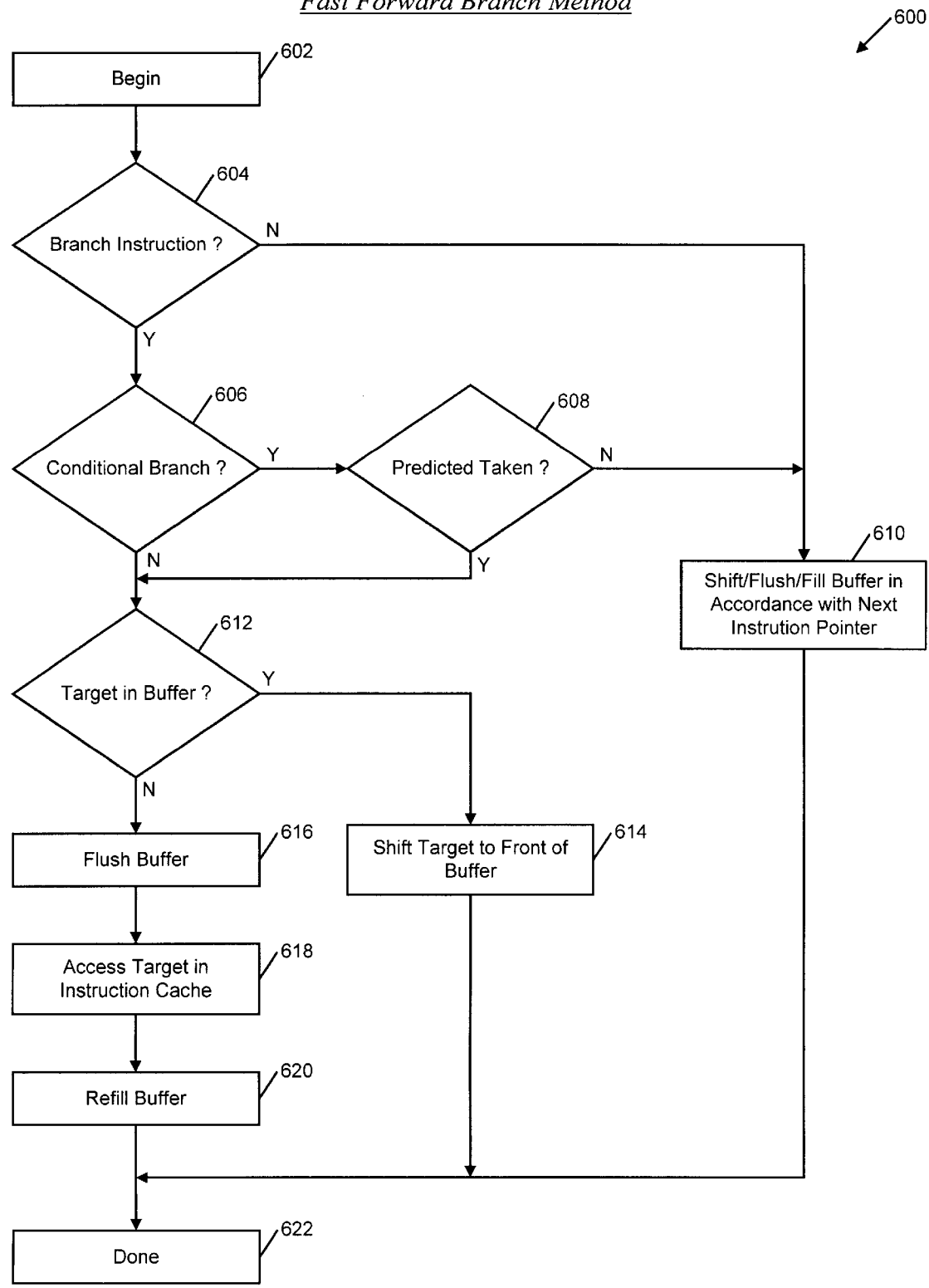

APPARATUS AND METHOD FOR FAST FORWARD BRANCH

BACKGROUND OF THE INVENTION

1. Field of the Invention

This invention relates in general to the field of instruction execution in computers, and more particularly to an apparatus and method for executing a forward branch instruction in a pipeline microprocessor.

2. Description of the Related Art

An application program for execution on a microprocessor consists of a structured series of macro instructions that are stored in sequential locations in memory. A current instruction pointer within the microprocessor points to the address of the instruction currently being executed and a next instruction pointer within the microprocessor points to the address of the next instruction for execution. During each clock cycle, the length of the current instruction is added to the contents of the current instruction pointer to form a pointer to a next sequential instruction in memory. The pointer to the next sequential instruction is provided to logic that updates the next instruction pointer. If the logic determines that the next sequential instruction is indeed required for execution, then the next instruction pointer is updated with the pointer to the next sequential instruction in memory. Thus, macro instructions are fetched from memory in sequence for execution by the microprocessor.

Obviously, because a microprocessor is designed to execute instructions from memory in the sequence that they are stored, it follows that a program configured to execute macro instructions sequentially from memory is one which will run efficiently on the microprocessor. For this reason, most application programs are designed to minimize the number of instances where macro instructions are executed out of sequence. These out-of-sequence instances are known as jumps, or branches.

A program branch presents a problem because most conventional microprocessors do not simply execute one instruction at a time. Rather, a present day microprocessor consists of a number of pipeline stages, each stage performing a specific function. Instructions, inputs, and results from one stage to the next are passed in synchronization with a pipeline clock. Hence, several instructions may be executing in different stages of the microprocessor pipeline within the same clock cycle. As a result, when logic within a given stage determines that a program branch is to occur, then previous stages of the pipeline, that is, stages that are executing instructions following in sequence, must be cast out to begin execution of sequential macro instructions beginning with the instruction directed by the branch, or the branch target instruction. This casting out of previous pipeline stages is known as flushing and refilling the pipeline.

Additionally, a microprocessor maintains a number of sequential macro instructions queued up for decode in an instruction buffer, so that a macro instruction is provided each clock cycle for execution. When a program branch is encountered, the contents of the instruction buffer must also be flushed and refilled.

A conditional branch is a branch that may or may not occur, depending upon the evaluation of some specified condition. And, this evaluation is typically performed in later stages of the microprocessor pipeline. To preclude wasting many clock cycles associated with flushing and refilling the pipeline, present day microprocessors also provide logic in an early pipeline stage that predicts whether a conditional branch will occur or not. If it is predicted that a conditional branch will occur, then only those instructions prior to the early pipeline stage must be flushed, including those in the instruction buffer. Even so, this is a drastic improvement; correctly predicted branches are executed in roughly two clock cycles rather than many more.

Yet, present day branch prediction techniques do not consider the contents of the instruction buffer, because the branch prediction typically occurs in a pipeline stage that follows the instruction buffer. In fact, even if the target instruction for the branch is already present in the instruction buffer, the instruction buffer is still flushed and refilled. Thus, the target instruction is fetched again and placed in the buffer.

It has been observed that a notable percentage of conditional branch instructions in application programs branch forward in sequence by only a few instructions. Consequently, when these programs execute on a conventional microprocessor, a significant number of clock cycles are wasted flushing and refilling the instruction buffer with virtually the same contents. When branch prediction logic declares that a conditional branch will be taken, it is very likely that the branch target instruction is already in the instruction buffer.

Therefore, what is needed is a microprocessor that executes a forward branch much faster than has heretofore been provided.

In addition, what is needed is an apparatus in a microprocessor that determines if a branch target instruction is already within its instruction buffer when a branch is declared.

Furthermore, what is needed is a microprocessor that shifts a branch target instruction to the front of the instruction buffer when a conditional branch is declared rather than flushing the buffer and fetching the branch target instruction again.

Moreover, what is needed is a method for executing a forward branch in a microprocessor that determines if a branch target instruction is present in an instruction buffer and, if so, shifts it to the front of the buffer.

SUMMARY

To address the above-detailed deficiencies, it is an object of the present invention to provide a microprocessor that executes a forward branch without incurring undue delays associated with flushing and refetching a target instruction for the branch from the microprocessor's instruction buffer.

Accordingly, in the attainment of the aforementioned object, it is a feature of the present invention to provide a microprocessor for executing a forward branch. The microprocessor includes translation logic and instruction fetch logic. The translation logic receives a branch instruction from a front position of an instruction buffer, and directs the microprocessor to provide a branch target instruction in said front position. The instruction fetch logic is coupled to the translation logic and provides the branch target instruction in the front position. If the branch target instruction is already within the instruction buffer, then the instruction fetch logic shifts the branch target instruction directly to the front position.

Another object of the present invention is to provide an apparatus in a microprocessor that determines if a branch target instruction is already within its instruction buffer when a branch is declared.

In another aspect, it is a feature of the present invention to provide an apparatus in a microprocessor for providing a branch target instruction for translation. The apparatus has an instruction decoder, branch prediction logic, and instruction fetch logic. The instruction decoder receives a branch instruction from a front position in an instruction buffer and translates the branch instruction into associated micro instructions for execution by the microprocessor. The branch prediction logic is coupled to the instruction decoder and predicts that execution of the associated micro instructions will result in a branch to a branch target instruction. The branch prediction logic also directs the microprocessor to provide the branch target instruction in the front position. The instruction fetch logic is coupled to the branch prediction logic and determines if the branch target instruction is already within the instruction buffer. If the branch target instruction is already within the instruction buffer, the instruction fetch logic shifts the branch target instruction directly to the front position.

Another advantage of the present invention is that clock cycles are not wasted performing unnecessary flushes of the microprocessor's instruction buffer.

A further object of the invention is to provide a microprocessor that shifts a branch target instruction to the front of its instruction buffer when a conditional branch is declared rather than flushing the buffer and fetching the branch target instruction again.

In a further aspect, it is a feature of the present invention to provide a microprocessor for executing a forward branch. The microprocessor includes an instruction buffer, buffer maintenance logic, and a branch accelerator. The instruction buffer sequentially stores macro instructions for execution by the microprocessor. The buffer maintenance logic is coupled to the instruction buffer and provides a current instruction for translation in a front position of the instruction buffer. The branch accelerator is coupled to the buffer maintenance logic and directs the buffer maintenance logic to shift a branch target instruction to the front position.

A further advantage of the present invention is that forward branch instructions execute much faster than on a conventional microprocessor.

Yet another object of the present invention is to provide a method for executing a forward branch in a microprocessor that determines if a branch target instruction is present in an instruction buffer and, if so, shifts it to the front of the buffer.

In yet another aspect, it is a feature of the present invention to provide a method for executing a forward branch in a microprocessor. The method includes predicting that execution of a branch instruction will result in the forward branch to a branch target instruction; calculating if the branch target instruction is already present in an instruction buffer; and, if the branch target instruction is already present in the instruction buffer, shifting the branch target instruction to the head of the instruction buffer.

Yet another advantage of the present invention is that a method exists for utilizing a required branch target instruction that has already been queued up for execution in an instruction buffer.

BRIEF DESCRIPTION OF THE DRAWINGS

These and other objects, features, and advantages of the present invention will become better understood with regard to the following description, and accompanying drawings where:

FIG. 6 is a flow chart illustrating a method for performing a forward branch in a microprocessor according to the present invention.

DETAILED DESCRIPTION

In light of the above background on techniques for performing branches in a microprocessor, several related art examples will now be described with reference to FIGS. 1 through 3. These examples illustrate the problematic nature of present day branch execution techniques, particularly when a branch target instruction associated with a speculative forward branch is already present in an instruction buffer. Following this discussion, a detailed description of the present invention will be provided with reference to FIGS. 4 through 6. Use of the present invention allows a branch target instruction associated with a forward branch to be provided immediately for translation from the instruction buffer.

Figure 1:
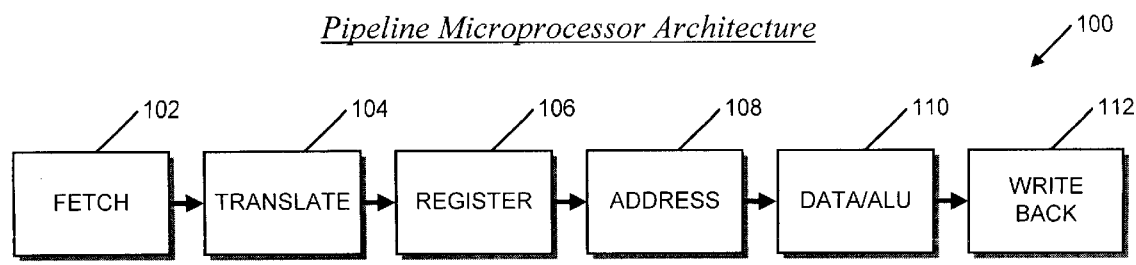
FIG. 1 is a block diagram of a related art pipeline microprocessor.

Referring to FIG. 1, a block diagram is presented of a related art pipeline microprocessor 100. The microprocessor 100 includes a fetch stage 102, translate stage 104, register stage 106, address stage 108, data/ALU stage 110 and write back stage 112.

Operationally, the fetch stage 102 fetches instructions from memory (not shown) that are to be executed by the microprocessor 100. The translate stage 104 translates, or decodes, the fetched instructions into associated micro instructions, each micro instruction directing the microprocessor 100 to perform a specific subtask related to accomplishment of an overall operation specified by a fetched macro instruction. The register stage 106 retrieves operands specified by the micro instructions from a register file (not shown) for use by later stages in the pipeline. The address stage 108 calculates memory addresses specified by the micro instructions to be used in data storage and retrieval operations. The data/ALU stage 110 either performs arithmetic logic unit (ALU) operations on data retrieved from the register file, or reads/writes data from/to memory using the memory address calculated in the address stage 108. The write back stage 112 writes the result of a data read operation, or an ALU operation, to the register file. Thus, macro instructions are fetched by the fetch stage 102 and are decoded into micro instructions by the translate stage 104, and the micro instructions proceed through stages 106–112 for execution.

Micro instructions move through successive stages of the microprocessor pipeline in synchronization with a microprocessor clock. Optimally, while any given stage in the pipeline is executing a micro instruction, the previous stage should be executing the next micro instruction. If a stage in the pipeline requires more than one cycle of the pipeline clock to execute a given micro instruction, flow of micro instructions through the microprocessor pipeline is effectively stalled: preceding stages in the pipeline are precluded from forwarding associated results down the pipeline and succeeding stages, having completed execution of a current micro instruction, sit idle. A stall in the pipeline is referred to as a slip, or a void, and is highly undesirable. In the absence of techniques to ameliorate the effects of slips, it follows then that the immediate speed of the microprocessor 100 is directly driven by the instruction in the pipeline that requires the greatest number of slips in a given pipeline stage.

For the above reason, most present day microprocessors employ numerous techniques to ensure that the effects of slips are minimized. Two such techniques, instruction buffering and branch prediction, are more specifically developed with reference to FIG. 2.

Figure 2:
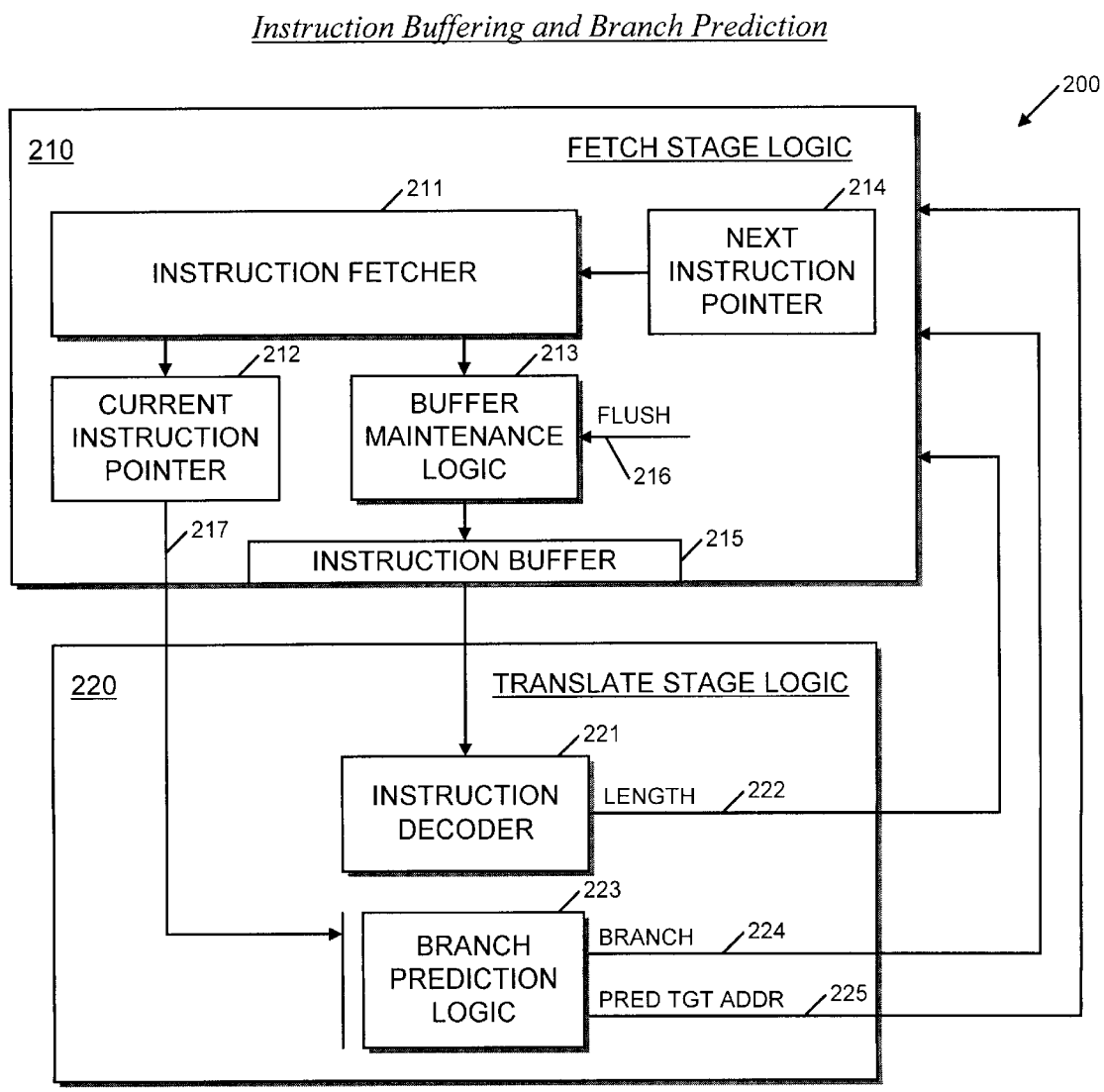
FIG. 2 is a block diagram of a portion of a related art pipeline microprocessor illustrating how an instruction buffer is maintained to provide instructions for translation.

Referring to FIG. 2, a block diagram of a portion of a related art pipeline microprocessor 200 is presented illustrating how an instruction buffer 215 is maintained to provide instructions for translation. The microprocessor 200 includes fetch stage logic 210 and translate stage logic 220. For clarity of discussion, remaining stages of the microprocessor 200 are not shown.

The fetch stage logic 210 has an instruction fetcher 211 that provides macro instructions to buffer maintenance logic 213. The buffer maintenance logic 213 maintains macro instructions sequentially in an instruction buffer 215 so they are available for retrieval each clock cycle by the translate stage logic 220.

The translate stage logic 220 has an instruction decoder 221, or translator 221, and branch prediction logic 223. The instruction decoder 221 retrieves macro instructions from the instruction buffer 215 and translates the macro instructions into associated micro instructions for execution by later stages in the microprocessor pipeline. The branch prediction logic 223 estimates if execution of a branch instruction will result in a program control branch and provides outputs 224, 225 indicating results of the estimation to the fetch stage logic 210.

Operationally, a sequential block of macro instructions in a desktop computer are copied from external memory (not shown) to an instruction cache (not shown) within the microprocessor 200. A typical instruction cache holds roughly 4,000 macro instructions. Logic (not shown) in the microprocessor 200 is dedicated to maintaining the instruction cache so that the instruction fetcher 211 does not have to wait for a macro instruction to be retrieved from memory. Most of the time, instruction caching techniques are successful: the instruction fetcher 211 fetches macro instructions directly from the instruction cache.

Yet, sometimes the instruction fetcher 211 is forced to wait for macro instructions to be retrieved from memory. And, to avoid sending a slip to the translate stage logic 220, the fetch stage logic 210 employs an instruction buffer 215. The instruction buffer 215 sequentially stores several macro instructions designated for execution in the instruction buffer 215, the instruction buffer 215 simply being an instruction cache on a smaller scale. Instruction buffers vary in size, an average size being approximately 16 bytes. Thus, if events arise such that the instruction fetcher 211 is required to wait for macro instructions to be retrieved from memory, the fetch stage logic 210 is able to continue providing macro instructions to the translate stage logic 220 during each clock cycle because several macro instructions have been buffered in the instruction buffer 215.

Application programs chiefly execute macro instructions sequentially. That is, execution of a first macro instruction stored in a given address in memory is followed by execution of a second macro instruction stored in a second address. The second address is offset from the first address in memory by a number of bytes, L, where L is the number of bytes required to store the first macro instruction. The number of bytes, L, is also called the length of an instruction. Execution of the second macro instruction is followed by execution of a third macro instruction stored in a third address that follows the second address, and so on.

Macro instructions are identified by their location in memory. The location of the macro instruction provided each cycle for translation is designated by a current instruction pointer 212. Because macro instructions vary in size, the instruction decoder 221 provides a length of the current macro instruction to the fetch stage logic 210 via bus 222. The length of the current instruction is used to update a next instruction pointer 214. If the next instruction to be executed is a sequential instruction that follows the current instruction, then the value of the next instruction pointer 214 is set to the value of the current instruction pointer plus the length provided via bus 222. In addition, since several sequential macro instructions are buffered in the instruction buffer 215, the current instruction length is used by the buffer maintenance logic 213. The buffer maintenance logic 213 shifts the next instruction by L bytes to move it to the front of the instruction buffer 215 so it can be retrieved by the translate stage logic 220 during the next clock cycle. Empty space at the rear of the instruction buffer 215 is filled with following sequential macro instructions. Macro instructions continue to execute sequentially until a program control transfer instruction is executed.

A program control transfer instruction performs the function that its name implies: sequential instruction execution is temporarily halted and control of the microprocessor 200 is transferred to another area of the application program where, most likely, sequential execution of macro instructions will continue. There are two types of program control instructions. One type unconditionally causes program control flow to be transferred to a different area of memory. Instructions of this type are known as unconditional control transfer instructions, unconditional jump instructions, unconditional branch instructions, or call/return instructions. Other program control instructions transfer program control flow to a different area of memory as a result of a condition being met. Instructions of this type are known as conditional program control transfer instructions, conditional jump instructions, or conditional branch instructions.

A conditional branch is a common form of program control transfer. For example, a program operating at location X in memory may test an input to the microprocessor 200. If the input satisfies some condition as prescribed by the particular conditional jump instruction being employed, then program control is transferred to location Y. Else, program execution continues to a next sequential macro instruction.

Conditional jump micro instructions are evaluated in the data/ALU stage of the microprocessor 200. But, by the time a conditional jump micro instruction proceeds through the data/ALU stage, a next sequential micro instruction is present in the address stage, a micro instruction following the next sequential micro instruction is in the register stage, and so on. Moreover, having assumed that sequential execution would continue following evaluation of the conditional jump micro instruction, the buffer maintenance logic 213 would most likely have filled the instruction buffer 215 with macro instructions that sequentially follow the conditional jump instruction.

If the evaluation does not result in the jump, or branch, being taken, then instruction execution continues uninterrupted as described above. If, on the other hand, the evaluation results in the branch being taken, then, because sequential instructions have been queued up for execution, many clock cycles are potentially consumed with removing, or flushing, the undesired sequential instructions from the pipeline and the instruction buffer 215 and thereafter filling the pipeline with sequential instructions beginning with the instruction that is the target of the branch. Such an instruction is called a branch target instruction, or branch target. To recap, a conditional jump instruction is evaluated. If a condition specified by the instruction is not met, then program control continues to the next sequential instruction. If the condition is met, then program control is transferred to the branch target instruction. To execute the branch, the pipeline must be flushed prior to fetching the branch target instruction.

Branch prediction techniques are utilized to minimize the number of clock cycles that are wasted in the execution of conditional branches. In the translate stage, the branch prediction logic 223 maintains an historical record of conditional jump instructions that have been executed. The current instruction pointer 212 for the current macro instruction in the instruction decoder 221 is provided to the branch prediction logic 223 via bus 217. If the current instruction is a conditional branch instruction, then the branch prediction logic 223 provides a branch control signal 224 indicating whether or not the branch is to be taken. If the branch is predicted to be taken, the branch prediction logic 223 also provides a predicted target address signal 225 indicating a predicted address in memory for the branch target instruction.

It is noted that the branch prediction logic 223, because it resides in the translate stage, cannot precisely determine whether or not the branch will be taken or not. This is because the associated condition is not evaluated until the data/ALU stage. In addition, the true target address of the conditional branch instruction cannot be precisely known either. Hence, a branch that is predicted to be taken by branch prediction logic 223 is known as an estimated branch, or a speculative branch.

One skilled in the art will appreciated that different microprocessors utilize different macro instructions to implement conditional branches. Also, it is understood that there are several different techniques used to speculate whether a conditional branch will be taken or not. Furthermore, one skilled will understand that that methods for providing a branch target address vary. A comprehensive discussion of conditional branch prediction methodology is beyond the scope of this application. It suffices to note that most present day microprocessors employ some form of branch prediction logic 223 to minimize the number of clock cycles that are associated with performing a conditional branch.

Hence, a conditional jump instruction is retrieved from the front position in the instruction buffer 215 and is provided to the instruction decoder. In parallel, the current instruction pointer 212 is provided to the branch prediction logic. If the conditional branch is predicted to be taken, then the branch control signal 224 and predicted target address 225 are provided to the fetch stage logic. 210. As a result, the fetch stage logic 210 provides a flush signal 216 to the buffer maintenance logic 213, thus causing the contents of the instruction buffer 215 to be flushed. During the same clock cycle, the next instruction pointer 214 is updated to point to the predicted target address. During the following clock cycle, the branch target instruction is fetched and shifted to the front position of the instruction buffer 215.

Correctly predicting that a conditional branch will occur will typically allow a conditional jump instruction to be executed in only two clock cycles: one cycle to flush the instruction buffer 215 and one cycle to fill it with macro instructions beginning with a branch target instruction in the front position. Incorrectly predicting a conditional jump requires many more cycles to execute than would be required if no branch prediction technique had been used in the first place. Yet, present day branch prediction techniques have improved to the extent that they correctly predict greater than 80 percent of all conditional branches, thus providing an overall measure of improvement to the execution speed of an application program. These aspects of branch prediction are more specifically described with reference to FIG. 3.

Figure 3:
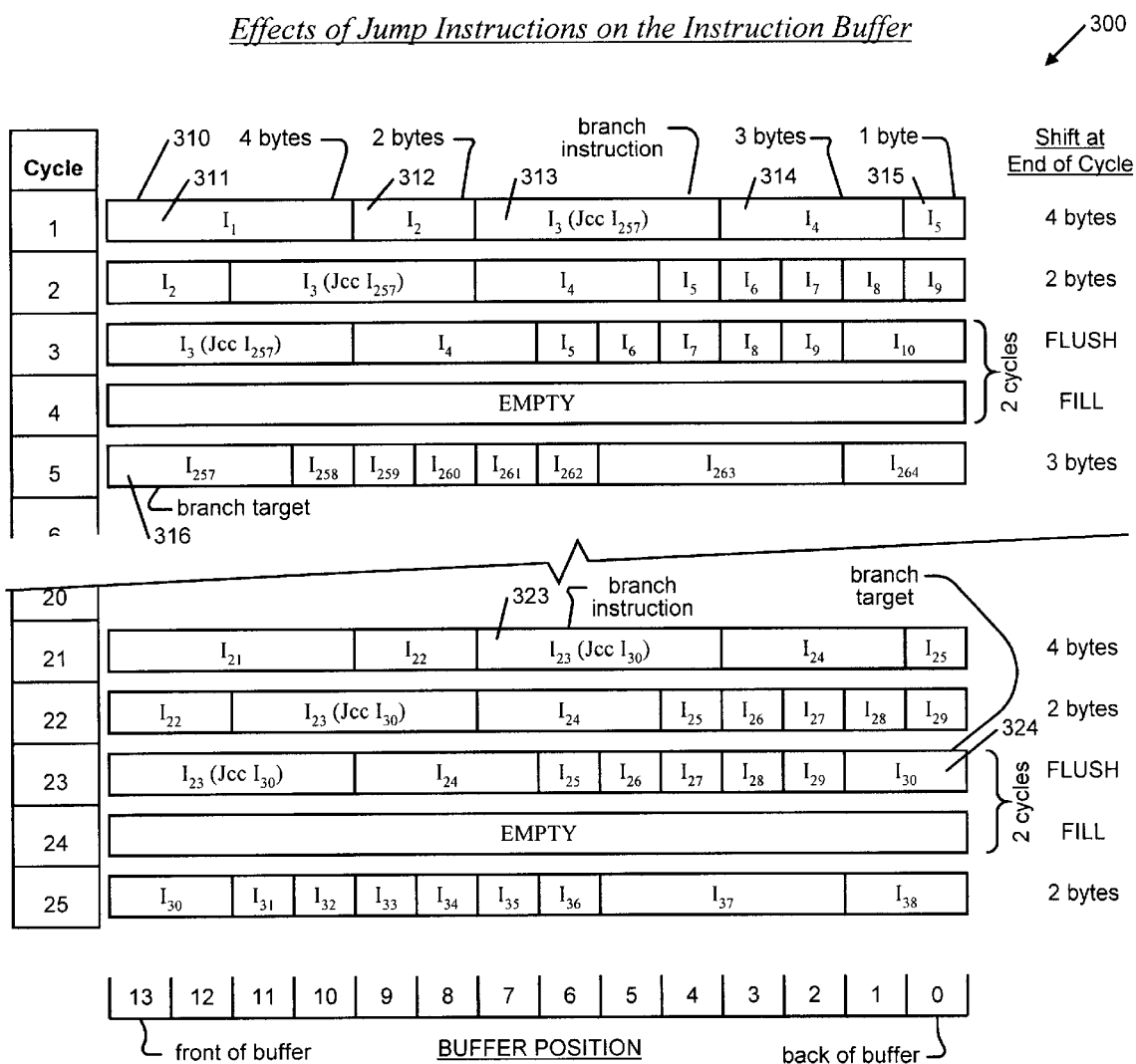
FIG. 3 is a diagram illustrating how branch target instructions corresponding to conditional branch instructions are provided by a microprocessor like the microprocessor of FIG. 2.

Referring to FIG. 3, a diagram 300 is presented illustrating how branch target instructions corresponding to conditional branch instructions are provided by a microprocessor like the microprocessor 200 of FIG. 2. The diagram 300 depicts contents of an instruction buffer 310 as macro instructions are shifted during each cycle of pipeline clock. For purposes of illustration, the instruction buffer 310 is shown to be 14 bytes in size with the high-order bytes corresponding to the front of the buffer.

The instruction buffer 310 initially contains five sequential macro instructions 311–315. A first macro instruction 311, $I_1$, is four bytes in length and occupies bytes 13 through 10 of the instruction buffer 310. Thus, $I_1$ is in the front position of the instruction buffer 310. A second macro instruction 312, $I_2$, is two bytes in length and occupies bytes 9 through 8 of the instruction buffer 310. Thus, $I_2$ is in the second position of the instruction buffer 310. A third macro instruction 313, $I_3$, is four bytes in length and occupies bytes 7 through 4 of the instruction buffer 310. In addition, $I_3$ is a conditional jump instruction 313 designated by Jcc $I_{257}$. Jcc specifies a condition for the branch and $I_{257}$ prescribes a branch target instruction. A fourth macro instruction 314, $I_4$, is three bytes in length and occupies bytes 3 through 1 of the instruction buffer 310. $I_4$ is the next sequential instruction following the conditional branch instruction 313. A fifth macro instruction 315, $I_5$, is one byte in length and occupies byte 0 of the instruction buffer 310.

During clock cycle 1, instruction $I_1$ is retrieved from the instruction buffer 310 by translate stage logic in the microprocessor. It is decoded by an instruction decoder into an associated micro instruction for execution by subsequent stages in the microprocessor pipeline. Also during clock cycle 1, a length of $I_1$, four bytes, is provided to fetch stage logic in the microprocessor. Hence, during cycle 1, instructions in the instruction buffer 310 are shifted by four bytes so that the second macro instruction 312, $I_2$, is in the front position of the instruction buffer 310. Accordingly, instructions $I_3$ through $I_5$ are also shifted, leaving four bytes at the back of the instruction buffer 310. Also during cycle 1, four 1-byte instructions, $I_6$ through $I_9$, are placed at the back of the instruction buffer 310 by buffer maintenance logic in the microprocessor.

During cycle 2, instruction $I_2$ is retrieved from the instruction buffer 310 by translate stage logic in the microprocessor. As it is decoded, its length, two bytes, is provided to fetch stage logic in the microprocessor. Accordingly, all the instructions in the instruction buffer 310 are shifted by two bytes so that the conditional jump instruction 313, $I_3$, is in the front position of the instruction buffer 310. Because the shift is two bytes, instruction $I_{10}$, a 2-byte instruction, is placed at the back of the instruction buffer 310.

During cycle 3, the conditional jump instruction, $I_3$ is retrieved from the instruction buffer 310 by translate stage logic in the microprocessor. As it is decoded, its length, four bytes, is provided to fetch stage logic in the microprocessor. Yet also during cycle 3, branch prediction logic in the microprocessor predicts that the branch to the target instruction, $I_{257}$, will indeed be taken. As discussed with reference to FIG. 2, the branch prediction logic signals the fetch stage logic to execute a speculative branch to the branch target instruction. As a result, during cycle 3, the buffer maintenance logic flushes instructions $I_4$ through $I_{10}$ from the instruction buffer 310 because they are not required anymore for execution.

During cycle 4, because the instruction buffer 310 was flushed during cycle 3, there is no instruction provided for translation. Thus, a slip is inserted into the microprocessor pipeline. Also during cycle 4, the fetch stage logic fills the instruction buffer 310 with sequential macro instructions beginning with the branch target instruction 316, $I_{257}$.

During cycle 5, the branch target instruction 316, $I_{257}$, is retrieved from the front position in the instruction buffer 310 and is decoded into an associated micro instruction for execution by subsequent stages in the microprocessor. Thus, the speculative branch to the branch target instruction 316, $I_{257}$, has been executed in two cycles of the microprocessor clock.

For clock cycle 21, the instruction buffer 310 also has five sequential macro instructions, $I_{21}$ through $I_{25}$, respectively equal in length to instructions $I_1$ through $I_5$. And, corresponding to conditional jump instruction $I_3$, instruction $I_{23}$ 323 is also a conditional jump instruction 323. The branch target instruction for conditional jump instruction $I_{23}$ 323 is designated within the instruction 323 as $I_{30}$.

During clock cycle 21, instruction $I_{21}$ is retrieved from the instruction buffer 310 by translate stage logic in the microprocessor. It is decoded by an instruction decoder into an associated micro instruction for execution by subsequent stages in the microprocessor pipeline. Also during clock cycle 21, a length of $I_{21}$, four bytes, is provided to fetch stage logic in the microprocessor. Hence, during cycle 21, instructions in the instruction buffer 310 are shifted by four bytes so that instruction $I_{22}$ is in the front position of the instruction buffer 310. Accordingly, instructions $I_{23}$ through $I_{25}$ are also shifted, leaving four bytes at the back of the instruction buffer 310. Also during cycle 21, four 1-byte instructions, $I_{26}$ through $I_{29}$, are placed at the back of the instruction buffer 310 by buffer maintenance logic in the microprocessor.

During cycle 22, instruction $I_{22}$ is retrieved from the instruction buffer 310 by translate stage logic in the microprocessor. As it is decoded, its length, two bytes, is provided to fetch stage logic in the microprocessor. Accordingly, all the instructions in the instruction buffer 310 are shifted by two bytes so that conditional jump instruction $I_{23}$ is in the front position of the instruction buffer 310. Because the shift is two bytes, instruction $I_{30}$, the 2-byte branch target instruction 324, is placed at the back of the instruction buffer 310.

During cycle 23, conditional jump instruction $I_{23}$ is retrieved from the instruction buffer 310 by translate stage logic in the microprocessor. As it is decoded, its length, four bytes, is provided to fetch stage logic in the microprocessor. Yet also during cycle 23, branch prediction logic in the microprocessor predicts that the branch to the target instruction, $I_{30}$, will indeed be taken. Consequently, the branch prediction logic signals the fetch stage logic to execute a speculative branch to the branch target instruction. As a result, during cycle 23, the buffer maintenance logic flushes instructions $I_{24}$ through $I_{30}$ from the instruction buffer 310. But, in contrast to the scenario discussed with reference to clock cycle 3, the flush of the instruction buffer 310 in clock cycle 23 actually discard the branch target instruction 323, $I_{30}$. Because a flush signal is provided, the buffer maintenance logic empties the instruction buffer without regard to its contents.

Hence, during cycle 24, because the instruction buffer 310 was flushed during cycle 23, there is no instruction provided for translation. Thus, a slip is inserted into the microprocessor pipeline. Also during cycle 24, the fetch stage logic fills the instruction buffer 310 with sequential macro instructions beginning with the branch target instruction 324, $I_{30}$.

During cycle 25, the branch target instruction 324, $I_{30}$, is retrieved from the front position in the instruction buffer 310 and is decoded into an associated micro instruction for execution by subsequent stages in the microprocessor. Thus, the speculative branch to the branch target instruction 324, $I_{30}$, also requires two cycles of the microprocessor clock to execute.

It is significant to note that conventional branch prediction techniques do not consider whether a branch target instruction is within the instruction buffer when a speculative branch is executed. Because of this, the scenario discussed with reference to clock cycles 21 through 25 prevails: to execute any speculative branch requires two clock cycles.

It has been observed, however, that many application programs exhibit a significant number of conditional branches that have branch target instructions only a few instructions forward of the conditional branch instruction. In other words, many conditional branches are executed when their corresponding branch target instructions are in the instruction buffer 310. This is precisely the scenario presented in FIG. 3 with reference to clock cycles 21 through 25. But, unfortunately, the branch target instruction 324 is flushed from the instruction buffer and must be fetched again, thus resulting in a pipeline slip. One skilled in the art will appreciate that to eliminate the pipeline slip for such cases will markedly improve the execution speed of an application program having many conditional branches where a branch target instruction is within the instruction buffer 310.

The present invention exploits a characteristic of a conditional jump instruction to determine whether a branch target instruction is already within an instruction buffer at the time a speculative branch is declared by branch prediction logic. If the branch target instruction is already within the instruction buffer, the instruction buffer is not flushed. Rather, the buffer contents are shifted so that the branch target instruction is moved to the front position, thus eliminating the need for a pipeline slip. The present invention is specifically discussed with reference to FIGS. 4 through 6.

Figure 4:
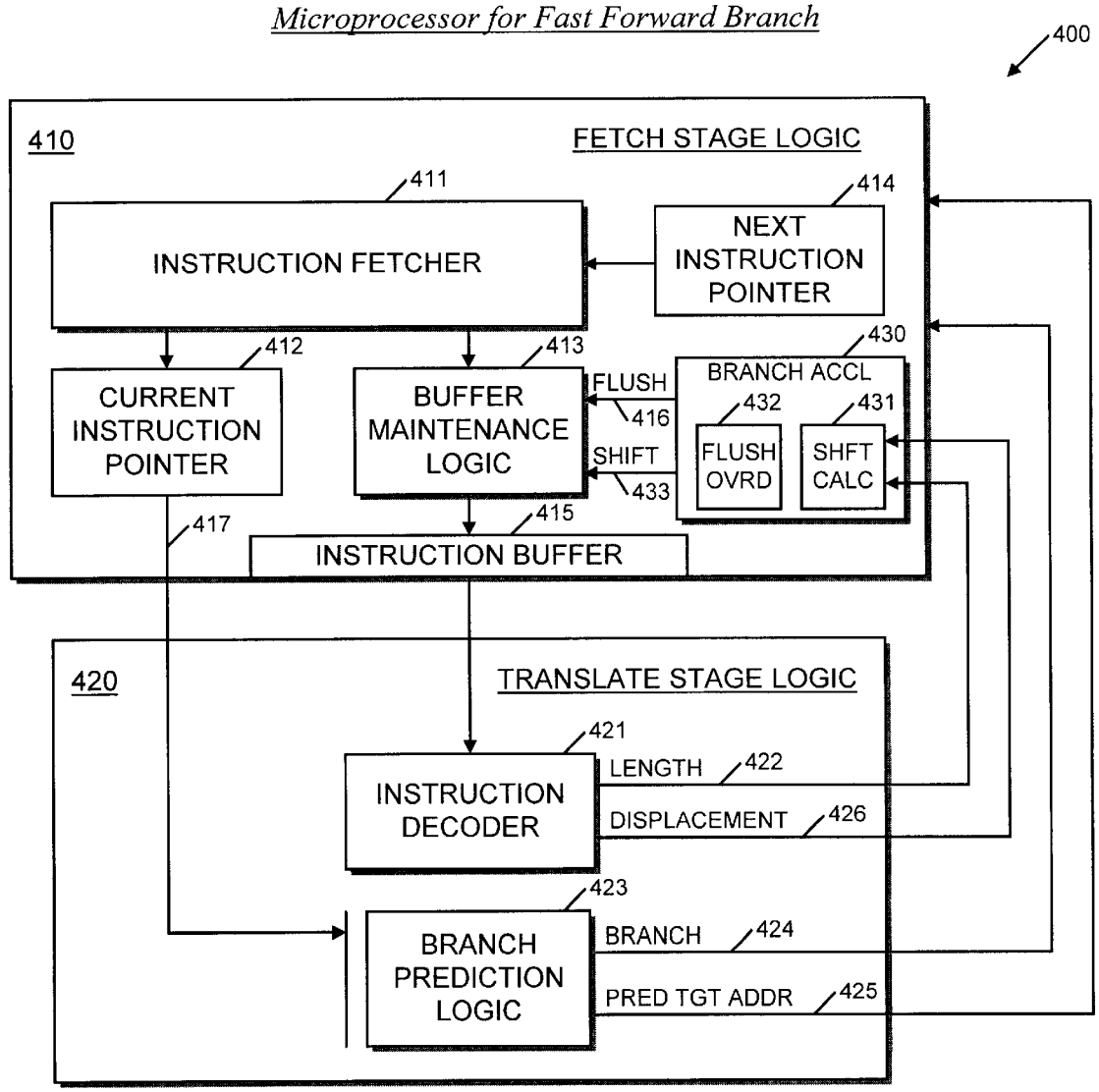
FIG. 4 is a block diagram of portion of a microprocessor according to the present invention for executing forward branch instructions.

Now referring to FIG. 4, a block diagram is presented of portion of a microprocessor 400 according to the present invention for executing forward branch instructions. Like the microprocessor 200 of FIG. 2, the microprocessor 400 of FIG. 4 includes fetch stage logic 410 and translate stage logic 420. For clarity of discussion, remaining stages of the microprocessor 400 are not shown.

The fetch stage logic 410 has an instruction fetcher 411 that provides macro instructions to buffer maintenance logic 413. The buffer maintenance logic 413 maintains macro instructions sequentially in an instruction buffer 415 so they are available for retrieval each clock cycle by the translate stage logic 420. In addition, the fetch stage logic 410 has a branch accelerator 430 that provides a shift output 433 and a flush output 416 to the buffer maintenance logic 413.

The translate stage logic 420 has an instruction decoder 421, and branch prediction logic 423. The instruction decoder 421 retrieves macro instructions from the instruction buffer 415 and translates the macro instructions into associated micro instructions for execution by later stages in the microprocessor pipeline. The branch prediction logic 423 estimates if execution of a branch instruction will result in a program control branch and provides outputs 424, 425 indicating results of the estimation to the fetch stage logic 410. In addition to a length signal 422, the translator 422 also provides a displacement signal 426 to the fetch stage logic 410.

For execution of sequential macro instructions, the microprocessor 400 operates just like the microprocessor 200 of FIG. 2. Each time a macro instruction is decoded by the translator 421, the length of the macro instruction is provided via signal 422. Shift calculation logic 431 in the branch accelerator 430 receives the length 422 and indicates via the shift signal 433 how many bytes to shift the contents of the instruction buffer 415 so that a next sequential instruction can be moved to a front position of the instruction buffer 415.

For execution of conditional branches, however, operation of the microprocessor 400 according to the present invention differs noticeably from a conventional microprocessor. The present invention utilizes an operand encoded into a conditional jump instruction: a displacement. The displacement operand is used within a conditional jump instruction to specify the location of the branch target instruction relative to the location of the instruction that follows the conditional branch instruction. More precisely, to determine the location of a given branch target instruction, one need only sum together the value of a current instruction pointer 412, the length 422 of the associated conditional branch instruction, and the displacement 426 provided in the associated conditional branch instruction. However, it is also noted that the sum of the length 422 and the displacement 426 can be used to indicate the location of a branch target instruction relative to the front of the instruction buffer 415, in other words, whether the branch target is within the instruction buffer 415 at the time a speculative branch is directed by signal 424.

Consequently, when a speculative branch is declared by branch prediction logic 423 according to the present invention, the shift calculation logic 431 sums the displacement 426 and the length 422 and determines if the branch target instruction is already within the instruction buffer 415. For example, suppose the instruction buffer 415 holds N bytes. If the sum of a displacement, D, and a length, L, is between 0 and N, then flush override logic 432 in the branch accelerator overrides the flush signal 416 which would otherwise be asserted and provides the calculated sum to the buffer maintenance logic via the shift signal 433. Consequently, the desired branch target instruction is shifted to the front of the instruction buffer and can be retrieved during the next clock cycle.

If the sum of the displacement 426 and the length 422 indicates that the branch target instruction is not within the instruction buffer, then the branch accelerator 430 simply directs the buffer maintenance logic 413 to flush the instruction buffer 415. After the instruction buffer 415 is flushed, it is filled with instructions beginning with the branch target instruction. These two cases are more specifically discussed with reference to FIG. 5.

Figure 5:
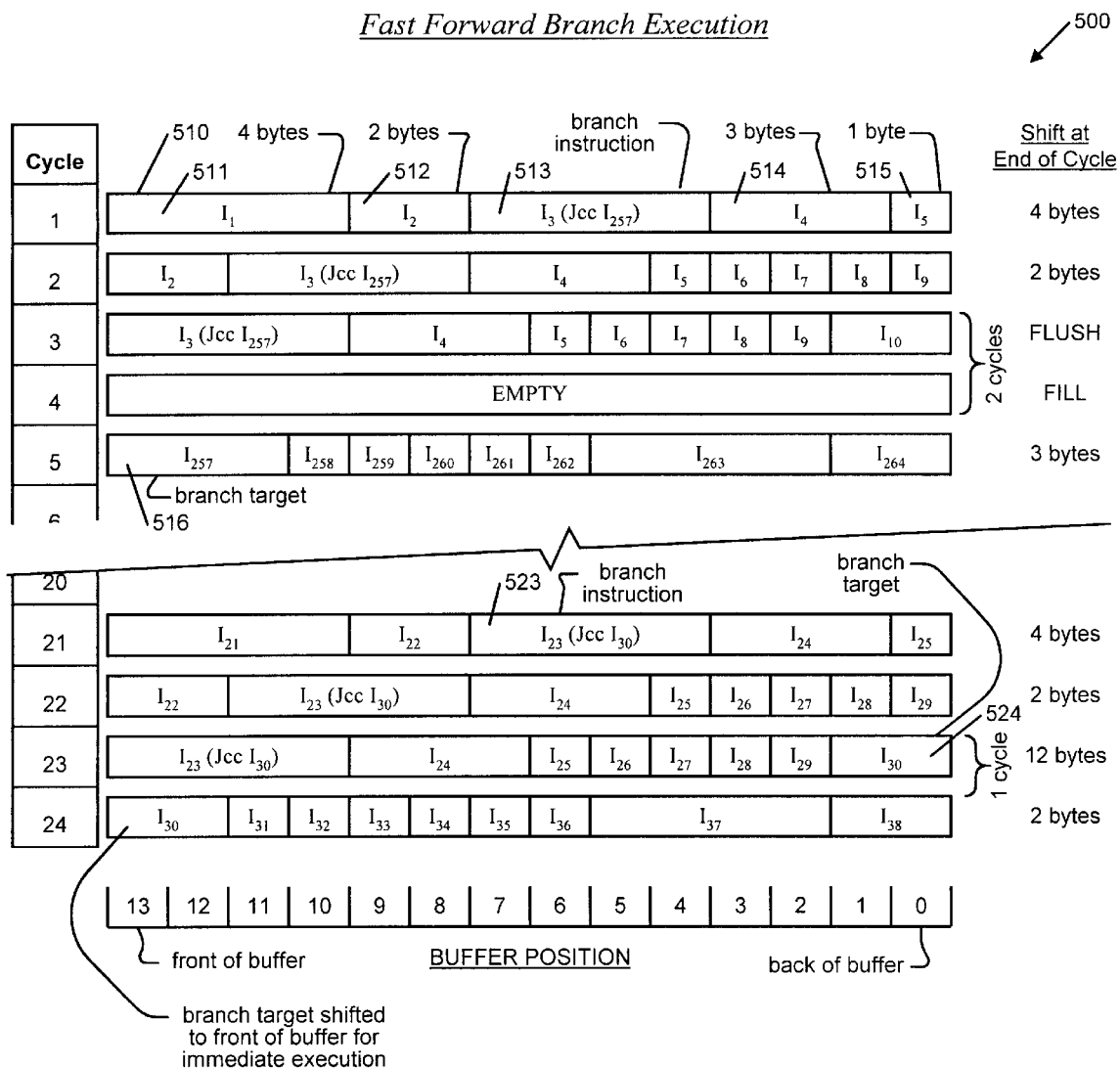
FIG. 5 is a diagram illustrating how branch target instructions corresponding to conditional branch instructions are provided by the portion of the microprocessor of FIG. 4.

Referring to FIG. 5, a diagram 500 is presented illustrating how branch target instructions corresponding to conditional branch instructions are provided by a microprocessor according to the present invention. The diagram 500 depicts contents of an instruction buffer 510 as macro instructions are shifted during each cycle of pipeline clock. For purposes of illustration, the instruction buffer 510 is shown to be 14 bytes in size with the high-order bytes corresponding to the front of the buffer.

The conditional jump case presented with reference to clock cycles 1 through 5 is exactly the same scenario as has been previously described with reference to FIG. 3. Like numbers refer to like elements, the hundreds digit being replaced with a five. During cycle 3, a conditional jump instruction 513, $I_3$, is retrieved from an instruction buffer 510 and decoded. During the same cycle, the conditional jump is predicted to be taken by branch prediction logic. And because a branch target instruction 516, $I_{257}$, is not already within the instruction buffer 510, a branch accelerator in the microprocessor asserts a flush signal directing buffer maintenance logic to flush the instruction buffer 510.

During cycle 4, due to the flush during cycle three, a slip is inserted into the microprocessor pipeline. Also during cycle 4, fetch stage logic fills the instruction buffer 510 with sequential macro instructions beginning with the branch target instruction 516, $I_{257}$.

The microprocessor according to the present invention operates in a conventional manner when a speculative branch is declared and the target of the branch is not already within the instruction buffer. Two cycles are required to execute the speculative branch.

The present invention benefits application programs exhibiting the scenario depicted in cycles 21 through 24 of FIG. 5. Note during cycle 23, when the conditional branch instruction 523, $I_{23}$, proceeds through the translate stage, a speculative branch is declared to branch target instruction 524, $I_{30}$. At this point, a conventional microprocessor would flush the instruction buffer 510, as has been previously discussed. However, shift calculation logic according to the present invention sums a displacement from the conditional branch instruction 523 to a length of the conditional branch instruction 523, both provided by translate stage logic. The sum indicates that the branch target instruction 524 is already within the instruction buffer 510. Hence, flush override logic in the microprocessor precludes a flush signal from being sent to the buffer maintenance logic. Instead, the sum of the displacement and the length is provided via a shift signal. The buffer maintenance logic simply shifts contents of the instruction buffer 510 by the indicated number of bytes to move the branch target instruction 524 to the front position.

During the next cycle, cycle 24, the branch target instruction 524, is provided to the translate stage logic, thus executing the speculative branch in only one clock cycle.

The examples of FIGS. 4 and 5 show that use of the present invention will provide meaningful speed improvements to application programs having a significant number of conditional branches where corresponding branch targets are only a few instructions forward of their branch instructions. No slips are inserted into the pipeline because a flush is not required to move a branch target into position.

Now referring to FIG. 6, a flow chart 600 is presented illustrating a method for performing a forward branch in a microprocessor according to the present invention.

Flow begins at block 702, where translate stage logic in the microprocessor retrieves a macro instruction from a front position of an instruction buffer. Flow then proceeds to decision block 604.

At decision block 604, the macro instruction is evaluated to determine if it is branch instruction. If so, then flow proceeds to decision block 606. If not, then flow proceeds to block 610.

At decision block 606, the branch instruction is evaluated to determine if it is a conditional branch instruction. If so, then flown proceeds to decision block 608. If not, then flow proceeds to decision block 612.

At decision block 603, branch prediction logic in the microprocessor predicts whether or not the conditional branch will be taken. If the branch is predicted not taken, then flow proceeds to block 610. If the branch is predicted taken, then flow proceeds to decision block 612.

At block 610, maintenance of macro instructions in the instruction buffer is performed in accordance with a next instruction pointer. If the next instruction pointer indicates that the next instruction is a next sequential instruction, then the buffer contents are simply shifted in accordance with a current instruction length provided by the translate stage logic. If the next instruction pointer indicates that the next instruction for execution is not within the instruction buffer, then the buffer is flushed and refilled with instructions beginning with the instruction indicated by the next instruction pointer. Flow then proceeds to block 622.

At decision block 612, an offset and length obtained from the branch instruction are summed to determine if a target instruction for the branch is already within the instruction buffer. If so, then flow proceeds to block 614. If not then flow proceeds to block 616.

At block 614, contents of the instruction buffer are shifted by the number of bytes indicated by the sum formed in decision block 612. As a result, the target instruction is moved to the front position of the instruction buffer. Flow then proceeds to block 622.

At block 616, because the target instruction is not already in the instruction buffer, the buffer is flushed. Flow then proceeds to block 618.

At block 618, the target instruction is fetched from instruction cache or memory. Flow then proceeds to block 620.

At block 620, the instruction buffer is refilled with sequential instructions beginning with the target instruction that was fetched in block 618. Flow then proceeds to block 622.

At block 622, the method completes.

Although the present invention and its objects, features, and advantages have been described in detail, other embodiments are encompassed by the invention. For example, the present invention has been particularly described in terms of a branch accelerator that resides within a fetch stage of a microprocessor. The branch accelerator utilizes a displacement branch instruction along with the instruction's length to determine if a branch target instruction has already been buffered for translation. Although the branch accelerator is featured within the fetch stage, it could just as well reside within the translate stage as part of branch prediction logic.

In addition, the present invention has been characterized in FIG. 5 as having an instruction buffer 14 bytes in size. The buffer was sized for illustration purposes only. The present invention comprehends any size instruction buffer.

Furthermore, the present invention has been depicted as utilizing a sum of a displacement and an instruction length to determine if a target of a branch instruction has already been buffered because instruction buffers currently do not store any more information for a macro instruction other than the instruction bytes themselves. Future improvements may allow additional information to be provided along with the instruction bytes such as the location in memory from where the instruction was fetched. The present invention comprehends such improvements. If a branch target address provided by branch prediction logic matches with a location in memory carried for an instruction in the instruction buffer, then a branch target instruction is identified as being already within the buffer. Thus, it can be shifted to the front of the buffer.

Finally, the invention has been described in terms of an instruction buffer that stores macro instructions for the microprocessor. The invention also envisions an instruction buffer whose contents are decoded macro instructions, either wholly decoded, or partially decoded. That is, the contents of the instruction buffer could include predecoded, preformatted instructions that allow the translator to obtain useful information about the instructions, prior to decoding them into micro instructions.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A microprocessor for executing a forward branch, comprising:

translation logic, configured to receive a branch instruction from a front position of an instruction buffer, and to direct the microprocessor to provide a branch target instruction in said front position; and instruction fetch logic, coupled to said translation logic, configured to provide said branch target instruction in said front position;

wherein, if said branch target instruction is already within said instruction buffer, said instruction fetch logic shifts said branch target instruction directly to said front position.

2. The microprocessor as recited in claim 1, wherein, if said branch target instruction is not already within said instruction buffer, said instruction fetch logic flushes said instruction buffer and then fetches said branch target instruction from a memory.

3. The microprocessor as recited in claim 2, wherein said memory is an instruction cache.

4. The microprocessor as recited in claim 1, wherein said translation logic provides a length of a current instruction to said instruction fetch logic.

5. The microprocessor as recited in claim 4, wherein said instruction fetch logic shifts contents of said instruction buffer by said length to move a next sequential instruction to said front position.

6. The microprocessor as recited in claim 5, wherein said translation logic provides a displacement associated with said branch instruction to said instruction fetch logic.

7. The microprocessor as recited in claim 6, wherein said displacement prescribes a target address for said branch target instruction relative to said branch instruction.

8. The microprocessor as recited in claim 6, wherein said instruction fetch logic sums said displacement with said length to determine if said branch target instruction is within said instruction buffer.

9. An apparatus in a microprocessor for providing a branch target instruction for translation, the apparatus comprising:

an instruction decoder, for receiving a branch instruction from a front position in an instruction buffer, and for translating said branch instruction into associated micro instructions for execution by the microprocessor;

branch prediction logic, coupled to said instruction decoder, for predicting that execution of said associated micro instructions will result in a branch to a branch target instruction, and for directing the microprocessor to provide said branch target instruction in said front position; and instruction fetch logic, coupled to said branch prediction logic, for determining if said branch target instruction is already within said instruction buffer and, if said branch target instruction is already within said instruction buffer, for shifting said branch target instruction directly to said front position.

10. The apparatus as recited in claim 9, wherein said instruction buffer is N bytes in size.

11. The apparatus as recited in claim 10, wherein said branch instruction is L bytes in size.

12. The apparatus as recited in claim 11, wherein a next sequential instruction in said instruction buffer is offset from said branch instruction by L bytes.

13. The apparatus as recited in claim 12, wherein said branch instruction has a displacement of D bytes indicating that said branch target instruction is offset from said branch instruction L plus D bytes.

14. The apparatus as recited in claim 13, wherein, if said branch target instruction is within said instruction buffer, said instruction fetch logic shifts contents of said instruction buffer by L plus D bytes to move said branch target instruction to said front position.

15. The apparatus as recited in claim 15, wherein, if said branch target instruction is not within said instruction buffer, said instruction fetch logic flushes said instruction buffer and subsequently fills said instruction buffer from memory with macro instructions beginning said branch target instruction.

16. The apparatus as recited in claim 9, wherein said instruction fetch logic comprises:

buffer fill logic, for fetching macro instructions from memory and for maintaining a continuous stream of macro instructions within said instruction buffer.

17. The apparatus as recited in claim 16, wherein said instruction fetch logic further comprises:

a branch accelerator, coupled to said buffer fill logic, for calculating a number of bytes to shift contents of said instruction buffer to provide a said branch target instruction in said front position.

18. An apparatus in a microprocessor for shifting a non-sequential branch target instruction within an instruction buffer, comprising:

buffer maintenance logic, coupled to the instruction buffer, for shifting, within the instruction buffer, a sequential instruction to a front position; and a branch accelerator, coupled to said buffer maintenance logic, wherein if the non-sequential branch target instruction is already within said instruction buffer, said branch accelerator for directing said buffer maintenance logic to shift, within the instruction buffer, the non-sequential branch target instruction to said front position.

19. The apparatus as recited in claim 18, further comprising:

an instruction decoder, coupled to the instruction buffer, for translating a current instruction into associated micro instructions for execution by the microprocessor; and branch prediction logic, coupled to said instruction decoder, for estimating if execution of said associated micro instructions will result in a branch to the non-sequential branch target instruction, and for directing said buffer maintenance logic to provide the non-sequential branch target instruction in said front position.

20. The apparatus as recited in claim 19, wherein said buffer maintenance logic shifts the non-sequential branch target instruction to said front position if the non-sequential branch target instruction is already in the instruction buffer.

21. The apparatus as recited in claim 20, wherein, if the non-sequential branch target instruction is not already in the instruction buffer, said branch accelerator directs said buffer maintenance logic to flush the instruction buffer and to fill the instruction buffer with instructions beginning with the non-sequential branch target instruction.

22. The apparatus as recited in claim 18, wherein the instruction decoder provides a length and a displacement for a branch instruction to said branch accelerator.

23. The apparatus as recited in claim 22, wherein, said length and said displacement are summed to determine if the non-sequential branch target instruction is already in the instruction buffer.

24. A method for executing a forward branch in a microprocessor, the method comprising:

a) predicting that execution of a branch instruction will result in the forward branch to a branch target instruction;

b) calculating if the branch target instruction is already present in an instruction buffer; and c) if the branch target instruction is already present in the instruction buffer, shifting the branch target instruction to the head of the instruction buffer.

25. The method as recited in claim 24, wherein said calculating comprises:

i) adding a length of the branch instruction to a displacement provided by the branch instruction; and ii) comparing the sum obtained in i) to a size of the instruction buffer.

26. The method as recited in claim 25, wherein said shifting comprises:

moving contents of the instruction buffer by a number of bytes in the sum.

27. The method as recited in claim 24, further comprising:

d) if said branch target instruction is not already present in the instruction buffer, flushing the instruction buffer and then sequentially filling it with macro instructions from memory beginning with the branch target instruction.

* * * * *